E. J. SMITH, G. MAYER & C. VERGAN.
AUTOMATIC MILLING MACHINE.
APPLICATION FILED AUG. 17, 1916.

1,285,820.

Patented Nov. 26, 1918.
7 SHEETS—SHEET 1.

Witnesses:
Robert F. Brack
Albin C. Ahlberg

Inventors
Elmer J. Smith
George Mayer
Charles Vergan
By Williams Bradbury & Lee
Attorneys

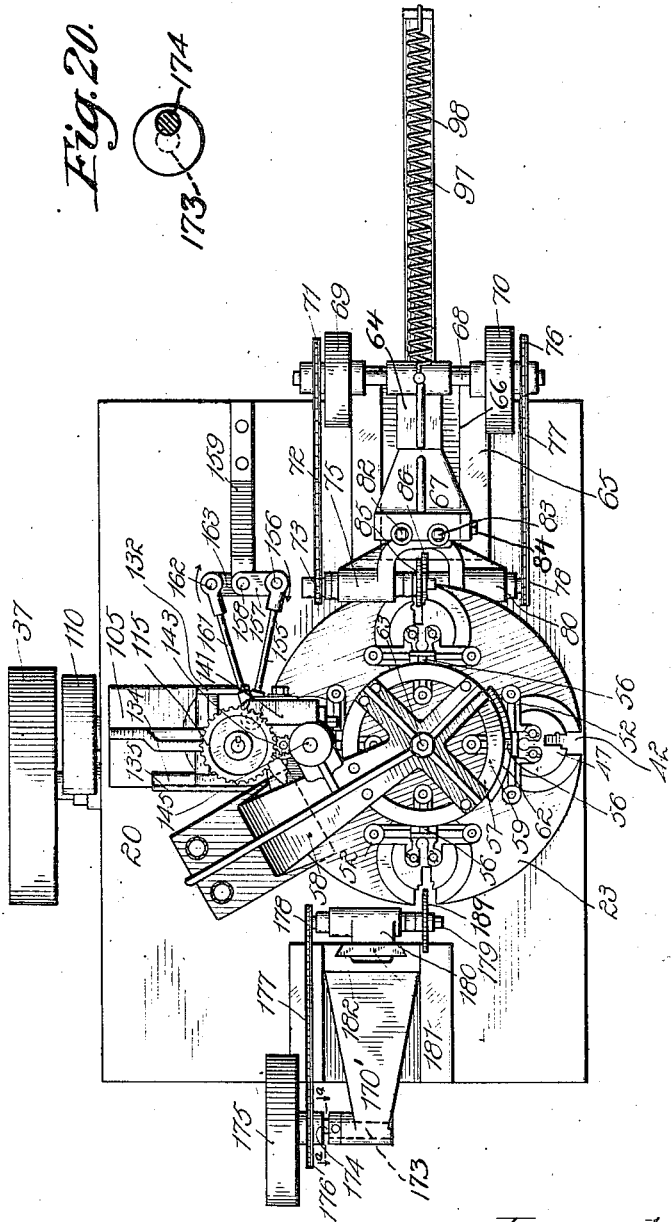

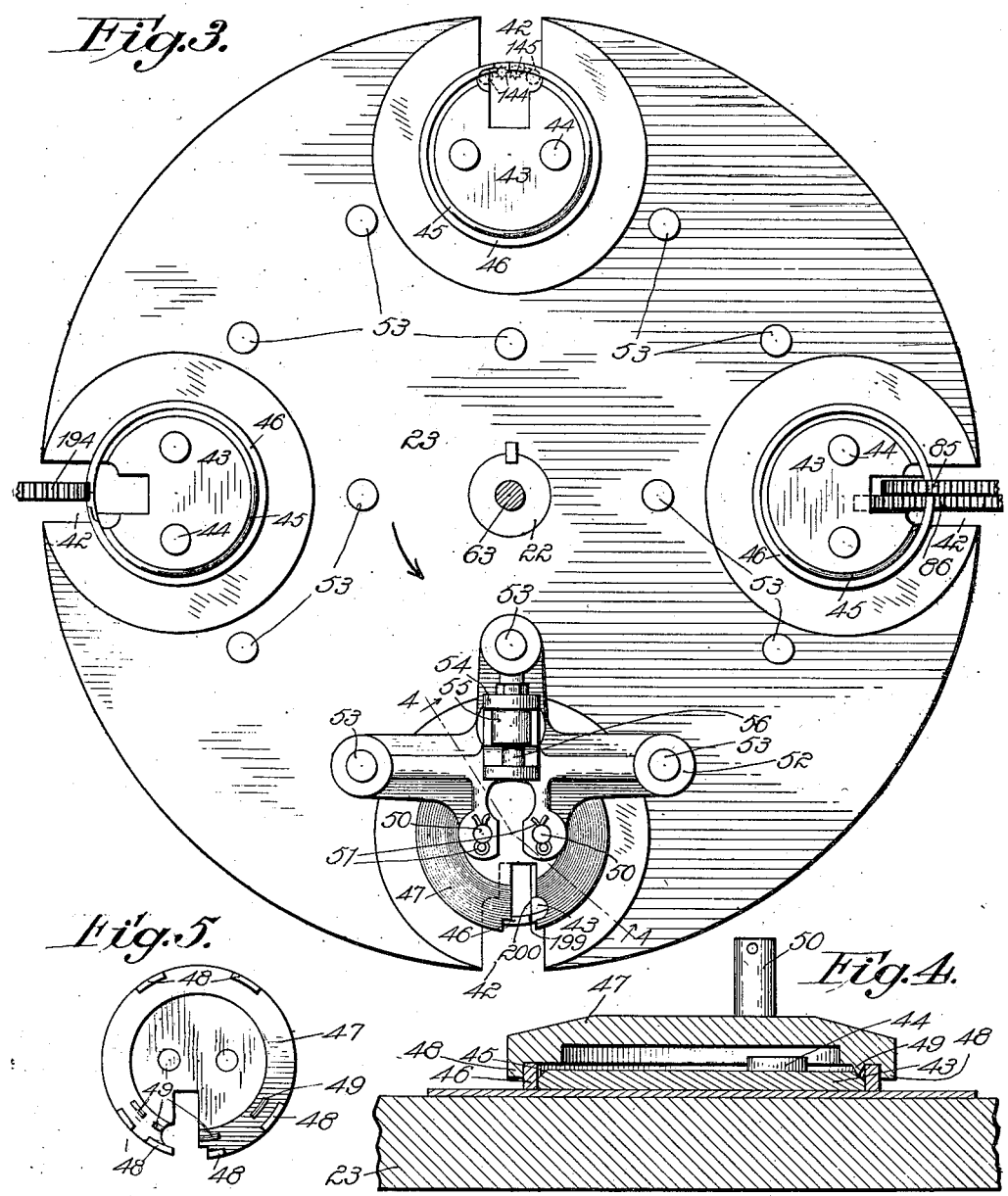

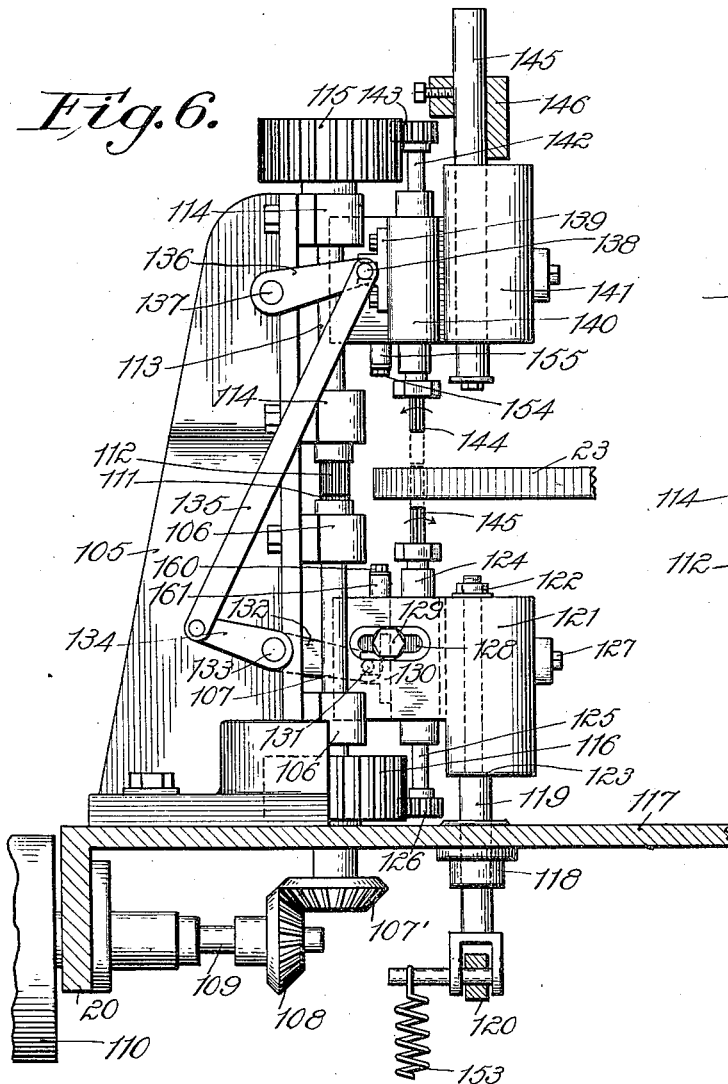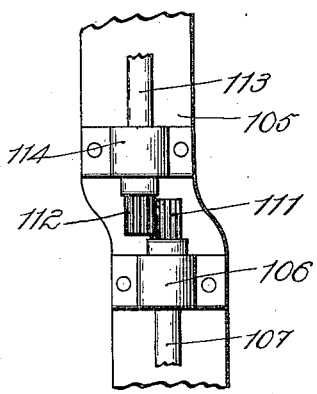

E. J. SMITH, G. MAYER & C. VERGAN.
AUTOMATIC MILLING MACHINE.
APPLICATION FILED AUG. 17, 1916.

1,285,820.

Patented Nov. 26, 1918.
7 SHEETS—SHEET 5.

Witnesses:
Robert F. Bracke
Albin C. Ahlberg

Inventors
Elmer J. Smith
George Mayer
Charles Vergan
By Williams Bradbury & Lee
Attorneys

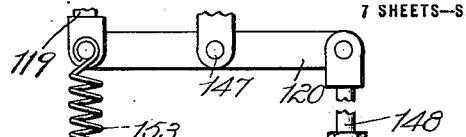
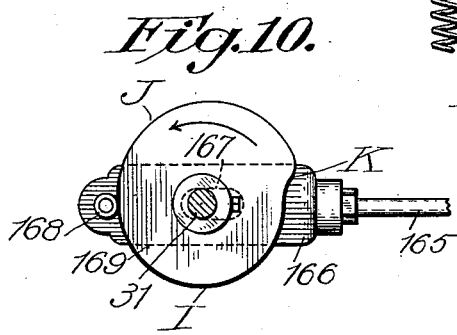
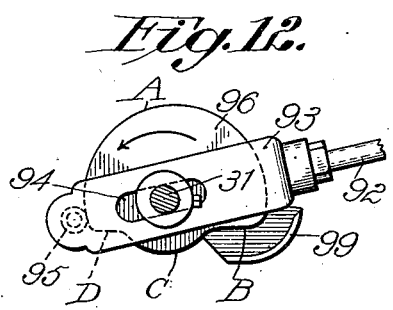
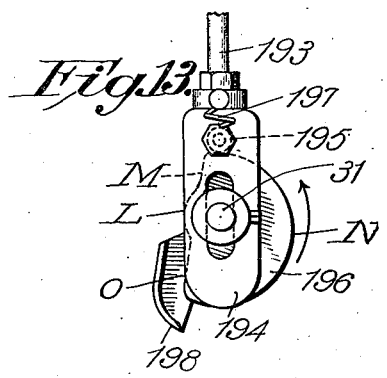
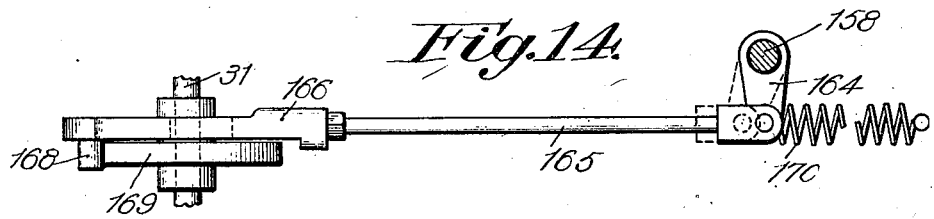

E. J. SMITH, G. MAYER & C. VERGAN.
AUTOMATIC MILLING MACHINE.
APPLICATION FILED AUG. 17, 1916.

1,285,820.

Patented Nov. 26, 1918.
7 SHEETS—SHEET 7.

Witnesses:
Robert F. Bracke
Albin C. Ahlberg.

Inventors
Elmer J. Smith
George Mayer
Charles Vergan
By Williams, Bradbury &c
Attorneys

UNITED STATES PATENT OFFICE.

ELMER J. SMITH, GEORGE MAYER, AND CHARLES VERGAN, OF CHICAGO, ILLINOIS, ASSIGNORS TO THE CHALSMITH COMPANY, OF CHICAGO, ILLINOIS, A CORPORATION OF ILLINOIS.

AUTOMATIC MILLING-MACHINE.

1,285,820.      Specification of Letters Patent.      Patented Nov. 26, 1918.

Application filed August 17, 1916. Serial No. 115,463.

*To all whom it may concern:*

Be it known that we, ELMER J. SMITH, a citizen of the United States, GEORGE MAYER, a subject of the Emperor of Austria-Hungary, and CHARLES VERGAN, a citizen of the United States, all residing at Chicago, in the county of Cook and State of Illinois, have invented a certain new and useful Improvement in Automatic Milling-Machines, of which the following is a full, clear, concise, and exact description, reference being had to the accompanying drawings, forming a part of this specification.

Our invention relates to automatic milling machines and particularly to that class of milling machines wherein the work operated upon by the machine undergoes certain successive milling or cutting steps, the work being automatically fed to the different milling attachments of the machine, or the work remaining stationary and the various milling attachments fed in their order to the work.

Although the device of our invention may be used for other purposes it finds particular utility in the manufacture of piston rings which are made expansible and contractible to tightly fit the space between the reciprocating piston and the wall of an internal combustion engine cylinder so that leakage of the gases within the cylinder is prevented. In the manufacture of piston rings, for which the particular machine herein shown is intended, the entire process of completing a ring is accomplished in three steps by five cutting operations. To accomplish these different cutting operations we have illustrated in the accompanying drawings one form of mechanism for carrying out these steps successively which consists of a turntable arranged to grasp and hold in position the piston ring to be operated upon by the machine. The turntable is arranged in the manufacture of the specific piston ring hereafter referred to to rotate, or partly rotate, at intervals, each part rotation of the turntable serving to carry a ring from one of the milling attachments to the other. After each partial rotation of the turntable it is held stationary and the milling apparatus is operated. As will more fully hereinafter appear the turntable is arranged to accommodate a plurality of rings, so that during each of the intervals during which the turntable is at rest, and while a completed piston ring is being removed and an unmilled ring is being substituted therefor, one of the rings is having the milling operation of the first step performed thereon, another the operations of the second step, etc.

In the accompanying drawings Figure 1 is a front elevational view of the device of our invention;

Fig. 2 is a plan view thereof;

Fig. 3 is a detail view of the turntable showing the various steps in the operation of the machine;

Fig. 4 is a vertical cross sectional view of the clamping device for tightly holding the piston ring in place. This view is taken along the line 4—4 of Fig. 3 looking in the direction indicated by the arrows;

Fig. 5 is a bottom view of the upper clamping member illustrated in Fig. 4;

Fig. 6 is a detail side elevational view of what we shall refer to hereinafter as the end milling mechanism, or the mechanism which performs the second step upon the piston rings;

Fig. 7 is a fragmentary front elevational view of the mechanism illustrated in Fig. 6;

Fig. 10 is a vertical cross sectional view taken along the line 10—10 of Fig. 8.

Fig. 11 is a vertical cross sectional view taken along the line 11—11 of Fig. 8;

Fig. 12 is a vertical cross sectional view taken along the line 12—12 of Fig. 8;

Fig. 13 is a side elevational view of the cam and its associated mechanism for controlling the vertical feed of the single cutter hereinafter referred to;

Fig. 14 is a plan view of the cam illustrated in Fig. 10 showing its connection with a shaft for laterally swinging the end mill mechanism;

Fig. 20 is a detail sectional view taken on line a—a Fig. 2.

Similar characters of reference refer to similar parts throughout the several views.

Figure 1:
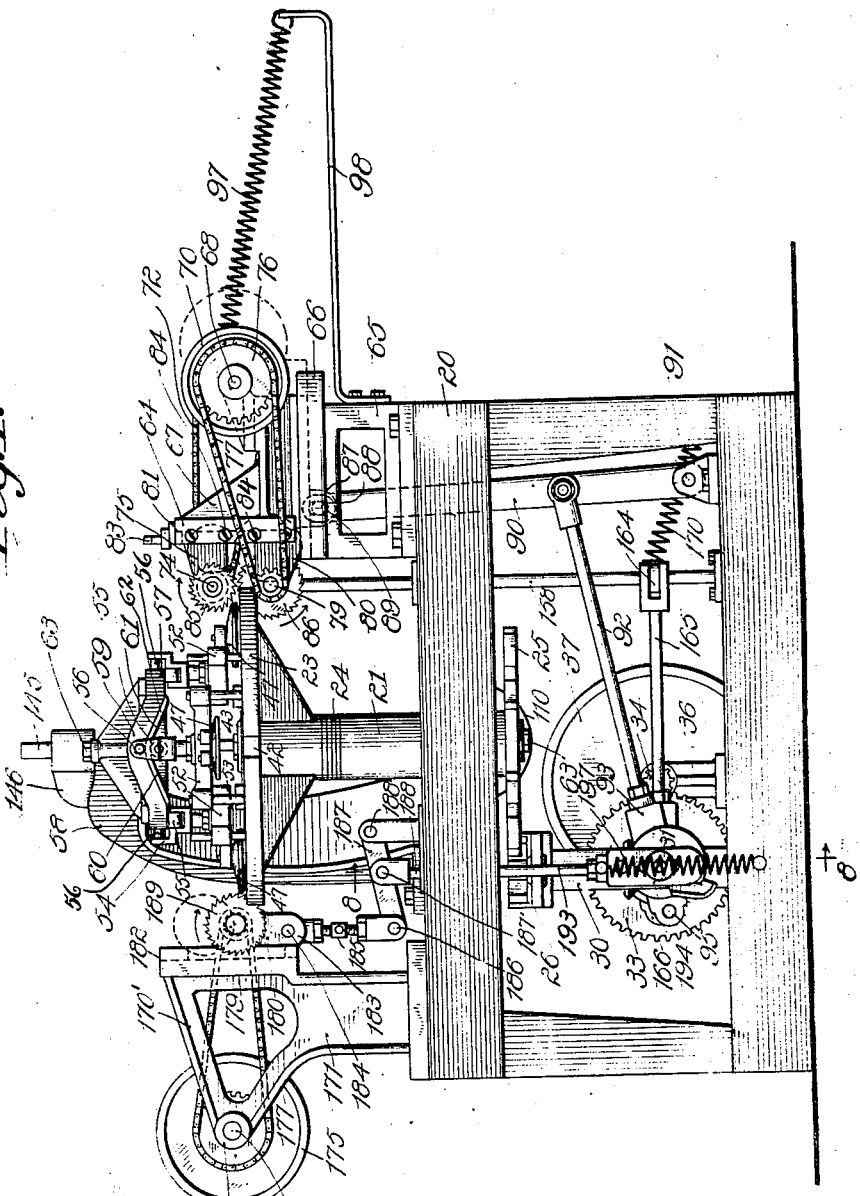
Figure 8:
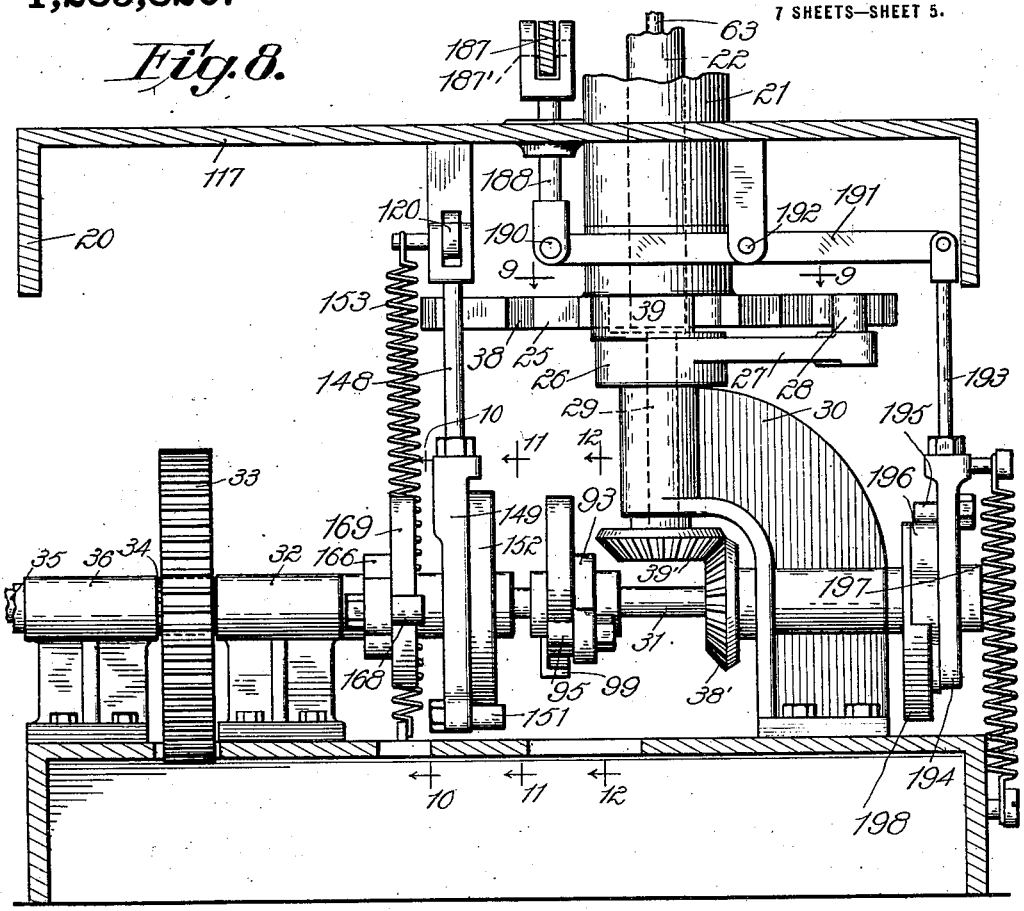
Fig. 8 is a vertical cross sectional view taken along the line 8—8 of Fig. 1 looking in the direction indicated by the arrows.
Figure 9:
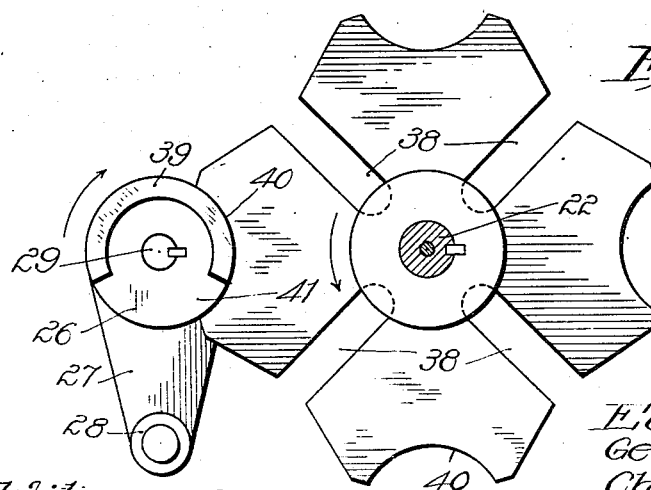
Fig. 9 is a detail view of the Geneva gearing employed to impart to the turntable a step by step rotary motion. This view is taken along the line 9—9 of Fig. 8 looking in the direction indicated by the arrow.

Referring first to Fig. 1, 20 illustrates a support or table through which vertically extends a bearing stud 21. This stud contains a longitudinal bore through which extends a shaft 22 (Fig. 8) rigidly secured to the turntable 23. The underside of the turntable 23 rests upon the bearing members 24 located between the table and the stud 21. The lower end of the shaft 22 is rigidly fixed to a Geneva gear 25 arranged to mesh with the Geneva pinion 26 in the form of an arm 27 carrying at its outer end the roller 28. The Geneva pinion 26 is fixed to the shaft 29 (Fig. 8) journaled in a support or bracket 30. The bracket 30 serves also as a bearing for a second shaft 31 lying horizontally and journaled also in the bearing 32. A gear wheel 33 is mounted on the shaft 31 and is arranged to mesh with the pinion 34 mounted on the power shaft 35 journaled in the bearing 36. The outer end of the power shaft 35 is provided with the pulley 37 illustrated in Figs. 1 and 2. Fixed to the shaft 31 is a bevel gear 38' meshing with a similar gear 39' carried at the lower end of the shaft 29. The shaft 31 is rotated in a direction so as to impart to the Geneva pinion motion in the direction indicated by the arrow in Fig. 9. As the Geneva pinion is rotated the roller 28 is fed into one of the slots 38 of the Geneva gear and turns the gear, and thus the turntable, 90° in the direction indicated by the arrow (Fig. 9). To positively lock the turntable against rotation between the intermittent steps the Geneva pinion is provided with a flange 39 arranged to extend into the semicircular portion 40 of the Geneva gear. The flange 39 is, however, cut away at 41 so that when the roller 28 extends into one of the slots 38 the Geneva pinion is clear of the gear and permits the 90° rotation thereof.

The turntable is cut away at the four places indicated at 42 and contains at each of these cut away portions a piston ring holding plate 43 secured by means of the screws or rivets 44 to the table. These plates 43 are beveled at 45 and are slightly elliptical in shape as are the piston rings before they are completed. A piston ring is illustrated in place in Fig. 4 at 46 around the plate 43 and under the clamping cap 47. This cap, as most clearly illustrated in Fig. 5, contains a plurality of downwardly extending lugs 48 arranged to extend over the outer side of the piston ring and a plurality of bevel lugs 49 arranged to extend on the inside of the piston ring, as illustrated in Fig. 4. Each one of the caps 47 contains two upwardly extending studs 50 secured by means of the cotter pins, or equivalent means, 51 to a clamping bracket 52. There are four of these clamping brackets provided, one for each one of the plates 43. These brackets are arranged to have vertical movement relative to the turntable and to guide them in their vertical movement we provide for each one of the brackets three guiding studs 53—53 carried by the turntable and loosely extending through so many apertures in the bracket. Carried by each one of the brackets 52 is an upwardly extending roller carrier 54 rotatably supporting the two rollers 55 and 56, the roller 56 being placed a greater distance from the center of the turntable than the roller 55 and in a plane higher than the roller 55. Each one of the rollers 55 is arranged to ride upon the under surface of a cam ring 57 supported by means of a bracket 58 concentric with and directly above the turntable. This cam ring is circular in shape and is perfectly flat except at the front of the machine where it is turned up at 59 to provide the two cam faces 60 and 61 against which the rollers 55 ride. The upturned portion 59 of the cam ring 57 carries an outwardly extending plate 62 which is arranged to receive upon its upper face the underside of the rollers 56. Fig. 1 shows the front clamping bracket in its up or open position ready to receive a piston ring. As the turntable is rotated in a counter-clockwise direction (Fig. 3) the roller 55 of the bracket last mentioned will engage the cam face 61 of the cam ring 57 causing downward movement of the bracket and clamping cap 47. This downward movement of the bracket and cap is continued until the roller 55 reaches that portion of the cam ring 57 which lies parallel with the plane of the turntable in which position the clamping cap 47 will have been lowered sufficiently to grasp the piston ring tightly and hold it in place. As the front bracket in Fig. 1 is thus moved away from the upturned portion 59 of the cam ring the next bracket is moved under the upturned portion 59. As the roller 56 approaches the upturned portion 59 it rides upwardly upon the plate 62 and thus lifts the clamping bracket and its cap to permit the removal of the finished ring and the insertion of a new ring to be acted upon. The ring 57 is held absolutely stationary and to prevent upward movement of the ring relative to the turntable a stay rod 63 is provided which is conected with the bracket 58 and which extends downwardly through the shaft 22 and bears against the underside of the Geneva gear 25.

Figure 16:
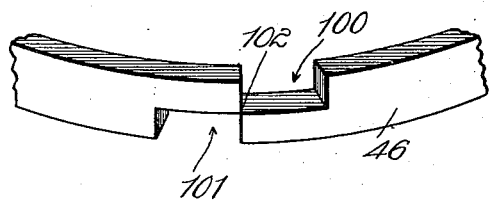
Fig. 16 is a fragmentary view of the ring, shown in Fig. 15 illustrating the ring as it appears after the first step has been performed upon it.

The mechanism for performing the first cutting step upon the piston rings is illustrated as a whole at 64 at the side of the turntable and 90° away from the front of the table in the direction in which the table is rotated. This mechanism we shall refer to hereinafter as the double cutter and consists of a stationary support 65 bolted, or otherwise secured, to the table 20. This support 65 has a guide-way 66 cut in it arranged to receive and guide the movable element or cutter supporting member 67. This support 67 is arranged to be moved toward and from the turntable as indicated by the full and dotted lines in Fig. 1. Bearing in the support 67 is a shaft 68 upon which are loosely mounted the pulleys 69 and 70. The pulley 69 is fixed to a sprocket wheel 71 meshing with a chain 72 extending over a second sprocket wheel 73. The sprocket wheel 73 is fixed on a shaft 74 journaled in an adjustable bracket 75. The pulley 70 is rotatably connected with a sprocket 76 meshing with a chain 77 extending over the sprocket wheel 78. The sprocket wheel 78 is mounted on a shaft 79 extending parallel with and under the shaft 74 and is journaled in the adjustable bracket 80. In making the brackets 75 and 80 adjustable we provide in the support 67 a guide way 81 into which the brackets 75 and 80 extend. A pair of adjustable screws is provided at 82 and 83 extending longitudinally through both brackets, the screw 82 having threaded engagement with the bracket 75 and extending loosely through the bracket 80 and the screw 83 extending loosely through the bracket 75 and having threaded engagement with the bracket 80. By turning the screws 82 or 83 the shafts 74 or 75 may be adjusted vertically to any position desired. To hold the brackets in position after the necessary adjustment has been made the set screws 84 are provided. The inner end of the shaft 74 carries the cutter 85 and the shaft 79 the cutter 86. These cutters, as most clearly illustrated in Fig. 3, are almost out of vertical alinement with one another and to prevent possible engagement between the teeth of the cutters they may be staggered one within the other as illustrated in Fig. 1. The pulleys 69 and 70 are rotated in directions such that the cutters 85 and 86 are given the direction of rotation indicated in Fig. 1. Extending downwardly from the support 67 is a pair of lugs 87 carrying a pin 88. This pin extends through a slot 89 provided in the upper end of a lever 90 pivoted at 91 to the machine frame. Connected with the lever 90 intermediate the pivot 91 and the pin 88 is a link 92 attached to a plate 93. This plate contains a slot 94, as illustrated in Fig. 12, through which the shaft 31 extends and carries at its outer end a roller 95 arranged to ride around the cam 96. When the cam 96 is in the position illustrated in Fig. 12 the cutters 85 and 86 assume the position illustrated in Figs. 1 and 2, or a position where they are about to start their milling operation upon the piston ring. As the cam 96 is rotated in the direction indicated by the arrow (Fig. 12) the roller 95 is caused to ride upon the surface A of the cam. This surface is arranged eccentric with the shaft 31 so that as the cam is rotated the roller 95, and thus the link 92, is gradually moved to the left (Figs. 1 and 12). This movement of the link, of course, imparts movement to the support 67 through the lever 90 and feeds the cutters over the piston ring. As the surface A of the cam recedes from under the roller 95 the face B is presented to the roller. As the roller rides on this last mentioned face it is moved inwardly toward the shaft 31, thereby moving the support 67 away from the turntable to the position illustrated in dotted lines (Fig. 1), a spring being employed at 97 to return the cutting tool support to its non-operating position. This spring has one end attached to the support 67 and its other end connected with an outwardly extending arm 98. To insure the inward movement of the roller 95 along the face B a flanged plate may be provided at 99 to force the roller inwardly as it leaves the working face A of the cam. If the plate 99 is employed it is not necessary to provide spring means such as shown at 97 to return the cutter support to its original position. The face C of the cam 96 is concentric with the shaft 31 so that the cutting tool support 67 remains stationary while the roller rides upon this last mentioned face and it is while the roller engages this face that the Geneva gear 25, and thus the turntable, is given its 90° rotation. After the turntable has been given its one step movement the face D is presented to the roller and the roller moved outwardly. It is to be noted that the faces A and D of the cam 96 cause movement of the support 67 toward the turntable, but it is only the face A which moves the cutting tool support when the cutting tools are in engagement with the piston ring the face D serving merely to feed the cutting support up to the work and this is done rather quickly due to the steep incline which the face D presents. When the cutting tools 85 and 86 have completed their work the ring has the appearance of that illustrated in Fig. 16, the portion 100 being removed by the cutter 85 and the portion 101 by the cutter 86. Due to the fact that the cutters 85 and 86 are not entirely out of alinement, but do instead overlap each other very slightly, the ring is parted at 102. To permit the various cutting tools to have access to the piston rings the clamping caps 47, as well as the plates 43, are cut away as illustrated in Fig. 3 so that that portion of the ring worked upon is exposed. When the cutters 85 and 86 are engaging or cutting a piston ring the cutter 85 extends into the place provided in the clamp 47, while the cutter 86 extends into the somewhat wider cut away portion provided in the plate 43.

Figure 17:
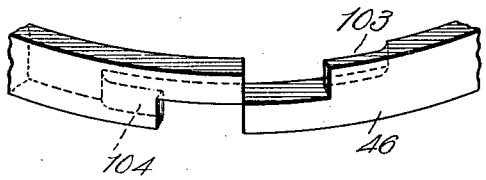
Fig. 17 illustrates the second step.

The next step cuts away the material at 103 and 104, as shown in Fig. 17, and is accomplished by means of the end mill mechanism illustrated in detail in Fig. 6. A bracket 105 is bolted to the machine frame and carries the bearings 106—106 in which is journaled the shaft 107 extending through the top plate 117 of the frame 20. The lower end of the shaft 107 rigidly carries the bevel gear 107′ meshing with a similar gear 108 mounted on a shaft 109. This shaft extends through the side wall of the machine frame and carries the power pulley 110. The upper end of the shaft 107 carries the pinion 111 (Fig. 7) meshing with a similar pinion 112 mounted upon the lower end of the shaft 113. This shaft is journaled in the bearings 114—114 carried by the bracket 105. The upper end of the shaft 113 carries the comparatively wide gear 115. A similar gear is provided at 116 for the bottom shaft 107 and is positioned slightly above the plate 117 of the frame 20. Upon rotation of the shaft 109 motion is imparted in opposite directions to the shafts 107 and 113 due to the pinions 111 and 112. The plate 117 carries on its underside a collar 118 through which loosely extends a rod 119 connected on the underside of the plate 117 with the lever 120. The rod 119 loosely extends through an arm 121 and has screwthreaded thereon over the arm 121 the nut 122. The arm 121 is permitted to swing in a horizontal plane about the rod 119 as a pivot, but is prevented from moving longitudinally independently of the rod by virtue of the nut 122 and the shoulder 123 which the rod 119 presents to the underside of the arm 121. Adjustably mounted on the arm 121 is a bearing 124 through which extends a shaft 125 running parallel with the shafts 107 and 113. The lower end of the shaft 125 carries the pinion 126 meshing with the gear 116 and, as illustrated, is narrower than the gear 116 so that it may be moved vertically and still retain mesh with its associated gear 116. The arm 121 is provided with a slot at 128 through which extends the bolt 129 screwthreaded into the bearing. The slot and bolt arrangement makes it possible to adjust the bearing or move it horizontally relatively to the arm. By turning the bolt down until the head engages the arm 121 the bearing is held in its adjusted position. Carried by the arm 121 is a bifurcated piece 130 into which extends a pin 131 carried at the outer end of a lever 132. This lever is attached to the shaft 133 extending through the bracket 105. Also attached to the shaft 133 is a second lever 134 which has pivoted thereto at its outer end a link 135 connected with the outer end of the lever 136. This lever 136 is pivoted at the point 137 and carries at its outer end a pin 138 extending into a bifurcated piece 139 similar to the one illustrated in connection with the arm 121. The bifurcated piece 139 is attached to the bearing 140 adjustably carried by the arm 141. The bearing 140 rotatably supports the shaft 142 carrying at its upper end the pinion 143 meshing with the gear 115 and at its lower end a cutting tool 144. A similar cutting tool 145 is carried by the shaft 125 at its upper end. The arm 141, bearing 140, and shaft 142 are similar to the arm 121, bearing 124, and shaft 125 so that the shaft 142 may be adjusted horizontally. Extending loosely through the arm 141 is a stationary rod 145 carried by the collar 146 extending from the bracket 58. The arm 141 is arranged to swing in a horizontal plane about the rod 145 as a pivot and arranged also to slide up and down upon the said rod.

As most clearly illustrated in Fig. 11, the rod 119 connected with the arm 121 is pivotally connected with the lever 120 in turn pivoted at 147 to the underside of the top plate 117 of the machine frame. The lever 120 is also pivotally attached to the cam rod 148 provided with a plate 149 containing a slot 150 through which the shaft 31 extends. The lower end of the plate 149 carries the roller 151 arranged to ride upon the periphery of the cam 152. A spring is provided at 153 attached to the lower end of the rod 119 and serves to normally retain the rod 119 in its lowermost position or, in other words, serves to retain the roller 151 in engagement with the cam 152. When the cam 152 assumes a position such that its face E is engaged by the roller 151 the arms 121 and 141 take the position illustrated in Fig. 6, that is, the cutting tools 144 and 145 are held respectively above and below the turntable away from the piston ring. As the cam 152 is rotated in a direction indicated by the arrow the inclined face F is presented to the roller and the rod 148 moved downwardly with the resut that the arm 121 is moved upwardly toward the turntable and piston ring. At the same time, however, the arm 141 with its cutting tool is moved downwardly due to the link connection 132, 134, 135, and 136 between it and the arm 121. This vertical movement of each of the cutting tools lowers the cutting tool 144 downwardly into the space 100 (Fig. 16) which has been cut away by the double cutter above referred to, and the cutter 145 is moved upwardly into the space 101. The downward and upward movement of the arms 141 and 121 respectively is just sufficient to cause the tools to slightly engage the piston ring. The surface G of the cam 152 is concentric with the shaft 31 so that the tools are held in the dotted line positions (Fig. 6) for a relatively long interval. When the face H is presented to the roller 151 the arms 121 and 141 are again caused to return to their original position as indicated in full lines in Fig. 6.

Having thus described the means for bringing the end milling tools into engagement with the piston ring we will now describe the means for swinging the cutters to cut away the portions 103 and 104 indicated in Fig. 17. Pivotally attached to the underside of the arm 141 at 154 is a link 155 extending horizontally away from the arm 141 and attached at 156 to an arm 157 fixed to a vertically extending shaft 158. This shaft, as most clearly shown in Fig. 1, extends through the frame of the machine from the base thereof and may be supported at its upper end by means of a brace rod 159 (Fig. 2). The lower arm 121 has pivotally attached to it at 160 the link 161 extending horizontally away from the arm 121 and connected at 162 with the arm 163, also attached to the shaft 158. As shown, the arms 157 and 163 are spaced substantially 180° apart so that upon oscillation of the shaft 158 the links 155 and 161 will be moved in opposite directions. Also attached to the shaft 158 is an arm 164 (Figs. 1 and 14) pivotally connected with a link 165 attached to the plate 166. This plate (Fig. 10) contains the slot 167 arranged to embrace the shaft 31. The outer end of the plate carries the roller 168 adapted to ride upon the face of the cam 169. To retain the roller in engagement with the cam 169 a spring is provided at 170 to produce a pull on the link 165 to the right (Fig. 14).

The surface I of the cam 169 is concentric with the shaft 31 and when the roller engages it, as it does in Fig. 10, the shaft 158 is held in the position illustrated in Fig. 2 or in a position such that the cutting tools 144 and 145 are held in vertical alinement with the cut away portions 100 and 101 respectively of the piston ring. The surface J of the cam in question is, however, eccentric in relation to the shaft 31 so that as the roller rides over it, as it is just about to do in Fig. 10, the roller 168 is moved away from the shaft 31, thus causing a longitudinal movement of the link 165. This last mentioned movement of the link 165 imparts to the shaft 158 a slight movement in the direction indicated by the arrows in Fig. 2, thus swinging the arm 141 in a counter-clockwise direction (Fig. 2) and the arm 121 in a clockwise direction. This swinging movement of the arms 121 and 141, of course, causes the cutting tools 144 and 145 to swing and cut away the portions indicated at 103 and 104 in Fig. 17. It may here be stated that the rods 119 and 145 upon which the arms 121 and 141 are mounted are disposed substantially concentric with the piston ring upon which the end mill mechanism is operating so that the cut away portions 103 and 104 are circular in shape, or parallel with the outside face of the piston ring. After the end mills have been swung to their furthermost position the face K is presented to the roller 168 and the end swing mechanism again returned to its normal position. The end swing of the arms 121 and 141 is so slight that engagement between the pinion 126 and gear 116 and between the pinion 143 and the gear 115 is always maintained, thus causing the cutting tools 144 and 145 to rotate constantly. When the cam 169 is in the position illustrated in Fig. 10 the cam 152 takes the position shown in Fig. 11, thus indicating that the cutting tools are moved into the space provided in the piston ring before the lateral swing is imparted to them and that their swing both outwardly and back is fully completed before the cutting tools are again moved away from the piston ring.

Figure 18:
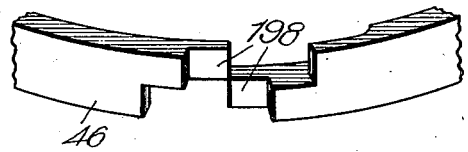
Fig. 18 illustrates the third and final step.

After the roller 151 rides over the surface H of the cam 152 the Geneva gear 25 is again given a one step movement to bring the piston ring acted upon by the end mills in front of the single cutter, illustrated as a whole at 170′, which performs the last step upon the piston ring. This single cutter consists of a support 171 mounted on the frame 20 and provided with a bearing 172 arranged to receive the shaft 173. This shaft carries the eccentric 174 (Fig. 2) upon which is loosely mounted the power pulley 175. By turning the shaft 173 the power pulley 175 may be adjusted to any position within certain limits. The pulley 175 has connected with it the sprocket wheel 176 meshing with a chain 177 extending around a second sprocket wheel 178. The sprocket wheel 178 is mounted upon the shaft 179 journaled in the bearing 180. The end of the shaft opposite the sprocket wheel carries the single cutter 189 located 90° away from the end mill cutters. The bearing 180 has sliding engagement with the support 171 as the support 67 of the double cutter has sliding engagement with its base 65, except that the bearing 180 is arranged to move vertically. As most clearly shown in Fig. 2, the bearing 180 contains a beveled base 181 fitting into a similarly shaped slot 182 in the support 171. The underside of the bearing 180 extends downwardly in the form of a pair of lugs 183 to which is pivotally attached at 184 a link 185. This link is connected at 186 at its lower end with a lever 187 pivoted at 188' to the frame 20. Also pivoted to the lever 187 intermediate its fulcrum and the pivot 186 at 187' is a rod 188 extending downwardly through the frame and connected at 190 with a second lever 191 pivoted at 192 to the underside of the frame. The front end of the lever 191 is connected with the rod 193 extending downwardly and attached to the plate 194. This plate carries the roller 195 arranged to coöperate with the cam 196. A spring may be employed at 197 to normally retain the roller in engagement with the cam faces. When the cam is in a position such that the roller 195 rides upon the face L the single cutter 189 is held in the position indicated in dotted lines in Fig. 1. As the cam is rotated in the direction indicated by the arrow the face M forces the roller away from the shaft 31 at a relatively high rate of speed thus forcing the cutting tool 189 downwardly to the position indicated in Fig. 1. This movement imparted to the cutting tool is not sufficient to cause it to engage the piston ring, but merely serves to place the cutter in immediate proximity thereto ready to act upon the ring. As the cam is rotated further the surface N gradually forces the roller upwardly, the surface N being arranged eccentric with the shaft 31. This gradual movement of the roller 197 produces a downward movement of the cutter through the piston ring thus forming in the piston ring the slot indicated at 198 in Fig. 18. When the slot has been completed the roller is forced downward along the face O of the cam back to its normal position whereupon the turntable is again moved another step. A flanged plate may be used at 198 instead of the spring 197 for returning the roller, and thus the arm 193 to its original position.

After the piston ring has left the last cutter 189 and has been advanced to the front of the machine it is removed and another ring placed around the plate 43 of one of the clamping means.

Figure 15:
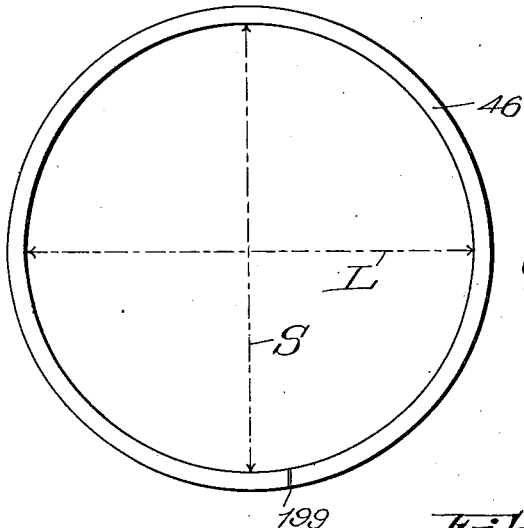
Fig. 15 is a view showing a piston ring before it is placed upon the machine.
Figure 19:
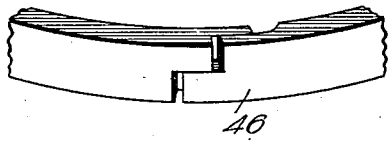
Fig. 19 shows the ring as it appears when it is in operative position so as to provide a tight joint, notwithstanding the fact that it is expansible and contractible.

As has been stated the ring as it is placed into the machine is elliptical in shape and to insure cutting of the ring at the proper point we employ the following means:

Fig. 15 is a view of the ring before it is placed into the machine, the line L indicating its long diameter and the line S its short diameter. The ring is marked at the point 199 slightly to the right of the short diameter line and when the ring is placed in position around one of the plates 43 of the turntable it is placed so that the mark 199 registers with the wall 200 of the plate produced by the slot therein to permit access to the piston ring. After the ring has been completed and is contracted as illustrated in Fig. 19 the diameter L becomes shorter and approximately the length of the diameter S.

Fig. 3 illustrates the four clamping plates 43, each holding a piston ring, and shows also the successive steps of the milling tools upon the piston rings. As a piston ring approaches the front of the machine, due to the intermittent rotation of the turntable, the completed ring is removed and a ring to be milled put in its place. The time interval between each part rotation of the turntable is substantially six or seven seconds, which means, of course, that a completed ring is removed from the machine every six or seven seconds.

Although we have described and illustrated our invention as a piston ring milling machine we do not desire to be in any way limited to this particular adaptation since the machine as a whole, or certain parts thereof, may be equally well used in other milling operations. The machine of our invention is entirely automatic so far as the milling operations are concerned so that after the milling attachments are adjusted the rings produced by the machine are exactly alike. On account of the various adjustments of the parts referred to it is possible to change the machine for any sized piston rings and such change may be made quickly and conveniently.

Having thus described our invention what we claim as new and desire to secure by Letters Patent of the United States is:

1. A work holder for automatic milling machines comprising a rotary table, a plurality of work clamping means carried by the table and movable perpendicularly with respect thereto, said clamping means being arranged to clamp work against the table, a cam ring disposed concentric with and above the table and provided with a portion turned upwardly away from the table, said clamping means being positioned under and arranged to be held in operating or lowered position by contact with the said cam ring, and devices for automatically lifting the clamping means when they assume a positon under the upturned portion of the cam ring.

2. A work holder for automatic milling machines comprising a rotary table, a plurality of work clamping means carried by the table and movable perpendicularly with respect thereto, said clamping means being arranged to clamp work against the table, a cam ring disposed concentric with and above the table and provided with a portion turned upwardly away from the table, said clamping means being positioned under and arranged to be held in operating or lowered position by contact with the said cam ring, and devices carried at the upturned portion of the cam ring for lifting a clamping means when said means is moved under the upturned portion of the cam ring.

3. In a milling machine the provision of a pair of cutters rotatable on axes parallel with each other, means for simultaneously moving both cutters toward or away from each other, and devices for swinging the cutters in a plane normal to the axes of rotation thereof.

4. In a milling machine the provision of a pair of cutters rotatable on axes parallel with each other, means for simultaneously moving both cutters toward or away from each other, and devices for swinging the cutters in a plane normal to the axes of rotation thereof and in directions opposite each other.

5. In an automatic milling machine the combination of a rotatable table arranged to hold in a plane normal to the axis of the table a piston ring to be milled, a milling tool, means for moving said tool toward and from the axis of said rotatable table, a second milling tool, mechanism for moving said second tool in a line substantially parallel to the axis of the table and then in a plane normal to the table axis, and devices for operating the table to feed the work from one milling tool to the other.

6. In an automatic milling machine the combination of a rotatable table arranged to hold in a plane normal to the axis of the table a piston ring to be milled, a milling tool, means for moving said tool toward and from the axis of the table through the piston ring, a pair of tools spaced from the first, one disposed above and the other below the piston ring to be milled, mechanism for moving said tools toward the piston ring and then in planes parallel thereto, and devices for operating the table to feed the work to the tools.

7. In an automatic milling machine the combination of a rotatable table arranged to hold in a plane normal to the axis of the table a piston ring to be milled, a milling tool, means for moving said tool toward and from the axis of said rotatable table through the piston ring, a second milling tool, mechanism for moving said second tool in a line substantially parallel to the axis of the table and then in a plane normal to the table axis, a third milling tool, means for moving said third tool in a line parallel to the axis of said table, and devices for operating the table to feed the work from one milling tool to the other.

8. In an automatic milling machine the combination of a rotatable table arranged to hold in a plane normal to the axis of the table a piston ring to be milled, a milling tool, means for moving said tool toward and from the axis of the table through the piston ring, a pair of milling tools spaced from the first, one disposed above and the other below the piston ring to be milled, mechanism for moving said tools toward the piston ring and then in planes parallel thereto, a fourth milling tool spaced from the said pair of tools, means for moving said fourth tool in a line substantially parallel to the axis of the table, and devices for operating the table to feed the work to the several milling tools.

In witness whereof, we hereunto subscribe our names, this 12 day of August, A. D. 1916.

ELMER J. SMITH.
GEORGE MAYER.
CHARLES VERGAN.

Witnesses:
MARY A. COOK,
ALBIN C. AHLBERG.